(12) United States Patent
Oh et al.

(10) Patent No.: US 10,001,790 B2
(45) Date of Patent: Jun. 19, 2018

(54) SECURITY SYSTEM WITH INTEGRATED HVAC CONTROL

(71) Applicant: Honeywell International Inc., Morristown, NJ (US)

(72) Inventors: Eric Oh, Syosset, NY (US); Ronald K. Rothman, Smithtown, NY (US); Kenneth L. Addy, Massapequa, NY (US); David S. Zakrewski, Babylon, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 650 days.

(21) Appl. No.: 13/777,460

(22) Filed: Feb. 26, 2013

(65) Prior Publication Data

US 2014/0244047 A1 Aug. 28, 2014

(51) Int. Cl.
| | | |
|---|---|---|
| *G05B 21/00* | (2006.01) | |
| *G05D 23/19* | (2006.01) | |
| *G08B 19/00* | (2006.01) | |

(52) U.S. Cl.
CPC .......... *G05D 23/1905* (2013.01); *F24F 11/30* (2018.01); *G08B 19/00* (2013.01); *F24F 11/33* (2018.01); *F24F 11/52* (2018.01); *F24F 11/56* (2018.01); *G05B 2219/2614* (2013.01)

(58) Field of Classification Search
CPC .......... H04L 2012/285; H04L 12/2803; H04L 12/282; H04L 12/2823; H04L 12/2825; H04L 12/2829; H04L 12/2834; H04L 29/0809; H04L 29/0899; H04L 41/0803; H04L 41/22; H04L 67/10; Y04S 10/123; Y04S 10/54; Y04S 20/221; Y04S 20/228; Y04S 20/242; Y04S 20/244; Y04S 40/126; Y04S 40/22
See application file for complete search history.

(56) References Cited

U.S. PATENT DOCUMENTS

| | | | | |
|---|---|---|---|---|
| 5,628,533 A | * | 5/1997 | Hill | B65D 50/046 292/80 |
| 6,362,953 B1 | * | 3/2002 | Ohlwine | H05K 5/0017 312/223.2 |

(Continued)

FOREIGN PATENT DOCUMENTS

| | | |
|---|---|---|
| DE | 10 2004 005 962 A1 | 8/2005 |
| DE | 10 2010 016 033 B3 | 4/2011 |

OTHER PUBLICATIONS

Search Report from corresponding EP application 14154221.7, dated Sep. 15, 2014.

(Continued)

*Primary Examiner* — Darrin Dunn

(74) *Attorney, Agent, or Firm* — Husch Blackwell LLP

(57) ABSTRACT

A monitoring security system can be coupled to a thermostatic HVAC control module, either wired or wirelessly. In at least some embodiments, an interactive interface of the monitoring security system can communicate with the thermostatic HVAC control module. Information as to operation of the monitoring security system and the thermostatic HVAC control module can be presented on a common display of the monitoring security system, and commands that are directed to the thermostatic HVAC control module can be entered via the monitoring security system.

9 Claims, 5 Drawing Sheets

Co-located security Keypad / Thermostat

(56) References Cited

U.S. PATENT DOCUMENTS

| | | | | |
|---|---|---|---|---|
| 6,369,695 B1* | 4/2002 | Horon | G08B 25/14 | 340/286.01 |
| 6,619,055 B1* | 9/2003 | Addy | F24F 11/006 | 236/46 R |
| 7,047,092 B2* | 5/2006 | Wimsatt | G05B 15/02 | 345/173 |
| 7,241,218 B2* | 7/2007 | Van Becelaere | F24F 11/0001 | 454/369 |
| 7,702,421 B2* | 4/2010 | Sullivan | F24F 11/0009 | 236/51 |
| 7,761,186 B2* | 7/2010 | Keller | G05B 15/02 | 160/5 |
| 8,219,665 B2* | 7/2012 | Backman | H04L 41/0803 | 709/224 |
| 8,384,559 B2* | 2/2013 | Hong | G01S 3/7803 | 340/539.3 |
| 8,387,892 B2* | 3/2013 | Koster | F24F 11/006 | 236/1 B |
| 8,532,839 B2* | 9/2013 | Drees | G05B 15/02 | 700/108 |
| 8,667,100 B2* | 3/2014 | Dixon | H04L 12/2827 | 709/221 |
| 9,080,782 B1* | 7/2015 | Sheikh | F24F 11/00 | |
| 9,435,557 B2* | 9/2016 | Albrecht | F24F 11/0001 | |
| 2004/0158666 A1* | 8/2004 | Korowitz | G05B 19/0423 | 710/301 |
| 2004/0260427 A1* | 12/2004 | Wimsatt | G05B 15/02 | 700/275 |
| 2005/0040943 A1* | 2/2005 | Winick | F24F 11/0086 | 340/539.1 |
| 2005/0090915 A1* | 4/2005 | Geiwitz | G05B 15/02 | 700/90 |
| 2005/0090943 A1* | 4/2005 | Kogure | B60G 17/0195 | 701/1 |
| 2005/0146220 A1* | 7/2005 | Hamel | B60C 23/0411 | 307/44 |
| 2005/0203648 A1* | 9/2005 | Martin | G05B 19/052 | 700/87 |
| 2005/0226201 A1* | 10/2005 | McMillin | H04L 45/00 | 370/348 |
| 2005/0270151 A1* | 12/2005 | Winick | F24F 11/0086 | 340/539.1 |
| 2006/0041322 A1* | 2/2006 | Naismith | G05B 19/042 | 700/18 |
| 2006/0076946 A1* | 4/2006 | Shvach | G01D 21/00 | 324/126 |
| 2006/0192022 A1* | 8/2006 | Barton | F24F 11/0012 | 236/94 |
| 2007/0084941 A1* | 4/2007 | de Pauw | F24F 11/0012 | 236/94 |
| 2007/0162157 A1* | 7/2007 | Chandhoke | G05B 19/056 | 700/17 |
| 2008/0167747 A1* | 7/2008 | Nakamura | G05B 19/41875 | 700/112 |
| 2008/0197204 A1* | 8/2008 | Whitney | A62C 99/00 | 236/51 |
| 2008/0315000 A1* | 12/2008 | Gorthala | B60H 1/00785 | 236/46 C |
| 2009/0057425 A1 | 3/2009 | Sullivan et al. | | |
| 2009/0140057 A1* | 6/2009 | Leen | F24F 11/006 | 236/49.3 |
| 2009/0140058 A1 | 6/2009 | Koster et al. | | |
| 2009/0140060 A1* | 6/2009 | Stoner | G05D 23/1934 | 236/51 |
| 2009/0143918 A1* | 6/2009 | Amundson | F24F 11/0086 | 700/278 |
| 2009/0211940 A1* | 8/2009 | Emoto | H04Q 9/00 | 206/710 |
| 2010/0070089 A1* | 3/2010 | Harrod | F24F 11/0086 | 700/277 |
| 2010/0106313 A1* | 4/2010 | Grohman | F24F 11/006 | 700/276 |
| 2010/0106333 A1* | 4/2010 | Grohman | F24F 11/006 | 700/278 |
| 2010/0170272 A1* | 7/2010 | Deangelis | F24F 11/0086 | 62/157 |
| 2010/0182743 A1* | 7/2010 | Roher | G05D 23/1917 | 361/679.41 |
| 2010/0193592 A1* | 8/2010 | Simon | F24F 11/0012 | 236/51 |
| 2010/0298980 A1* | 11/2010 | Bohan, Jr. | G05B 9/02 | 700/276 |
| 2010/0318227 A1* | 12/2010 | Steinberg | F24F 11/006 | 700/278 |
| 2001/0061015 | 3/2011 | Drees et al. | | |
| 2011/0054700 A1* | 3/2011 | Chan | G05D 23/1905 | 700/277 |
| 2011/0202783 A1* | 8/2011 | Venkatakrishnan | G06Q 50/06 | 713/340 |
| 2011/0313694 A1* | 12/2011 | Hampel | G01D 4/008 | 702/62 |
| 2012/0061480 A1* | 3/2012 | Deligiannis | F24F 11/0012 | 236/51 |
| 2012/0095601 A1* | 4/2012 | Abraham | E06B 9/68 | 700/278 |
| 2012/0193437 A1* | 8/2012 | Henry, Jr. | G05D 23/1905 | 236/51 |
| 2012/0246590 A1* | 9/2012 | D'Souza | G06F 3/048 | 715/771 |
| 2012/0253521 A1* | 10/2012 | Storm | G05D 23/1905 | 700/276 |
| 2012/0258609 A1* | 10/2012 | Warneke | H01R 9/2433 | 439/43 |
| 2012/0273581 A1* | 11/2012 | Kolk | F24F 11/006 | 236/91 D |
| 2012/0318879 A1 | 12/2012 | Babich | | |
| 2013/0123991 A1* | 5/2013 | Richmond | G05B 19/0426 | 700/276 |
| 2013/0170417 A1* | 7/2013 | Thomas | H04W 52/0216 | 370/311 |
| 2013/0268129 A1* | 10/2013 | Fadell | G06Q 10/20 | 700/278 |
| 2013/0345881 A1* | 12/2013 | Leise | F24F 11/0086 | 700/276 |
| 2014/0012950 A1* | 1/2014 | Doucette | G06F 15/173 | 709/218 |
| 2014/0031988 A1* | 1/2014 | Reeder | H04L 12/2816 | 700/276 |
| 2014/0207254 A1* | 7/2014 | Nishiyama | G05B 19/04 | 700/11 |
| 2014/0207288 A1* | 7/2014 | Albrecht | F24F 11/0001 | 700/276 |
| 2014/0226286 A1* | 8/2014 | Novotny | G05D 23/1902 | 361/747 |
| 2015/0061877 A1* | 3/2015 | Kates | G01N 33/0065 | 340/628 |
| 2015/0094829 A1* | 4/2015 | Iwatsu | G05B 19/056 | 700/86 |
| 2015/0112456 A1* | 4/2015 | Sikora | F24F 11/0086 | 700/83 |
| 2016/0025364 A1* | 1/2016 | Mills, Jr. | F24F 11/006 | 700/278 |

OTHER PUBLICATIONS

Honeywell—Tuxedo Touch Series Home Automation System—Installation and Setup Guide, Jul. 2011.

Second Office Action for corresponding CN patent application 201410063668.0, dated Dec. 8, 2016.

English-language translation of Second Office Action for corresponding CN patent application 201410063668.0, dated Dec. 8, 2016.

Honeywell, Intrusions and Communications, ECP-ISO (ECP Isolator), http://www.security.honeywell.com/hsc/products/expacc/ex/ad/274853.html, Jan. 1, 2004.

Honeywell, Intrusions and Communications, LYNX Plus (LYNX Plus Wireless Self-contained Security Control, http://www.security.

(56) References Cited

OTHER PUBLICATIONS honeywell.com/hsc/products/control/wi/ly/283765.html, Jan. 1, 2004.

Capitol City Security, Cellular Communications for alarm systems, Security Systems for your Home or Business—The Best Equipment & The Best Service!, http://www/ccsalarmsystems.com/honeywellcellularequip.html, Jan. 1, 2008.

Security Solutions, ECP Security and Alarm Systems—Beaumont—Certified Alarm Installers, http:www/ecpsecurity.com/, Jan. 1, 2011.

\* cited by examiner

SECURITY SYSTEM WITH INTEGRATED HVAC CONTROL

FIELD

The application pertains to security alarm systems used to monitor conditions in a region of interest. More particularly, the application pertains to such systems that incorporate one or more HVAC control interfaces.

BACKGROUND

Security alarm systems are known to monitor conditions in a region, for example, a residence or a commercial building. In the past, such systems did not include integrated thermostat functions or HVAC-type interfaces to control heating, cooling, or ventilation equipment.

FIG. 1 illustrates a known, residential configuration. As illustrated in FIG. 1, a residence R might include a security monitoring system with a local control panel P that communicates with a plurality of detectors D1, D2 . . . Dn installed throughout a structure. The detectors Di might include door or window position detectors, glass break detectors, intrusion detectors, gas, fire, or smoke detectors, or the like.

In addition to the security monitoring system, the residence R might include a separate thermostat T coupled to a furnace F and an air conditioner AC to maintain an appropriate environment in the residence. In known installations, two such systems have been separate and operated independently of one another.

Opportunities exist for integrated home/building control systems that include both security monitoring and environmental control. Preferably, such systems could provide both energy savings and remote access.

DETAILED DESCRIPTION

Figure 1:
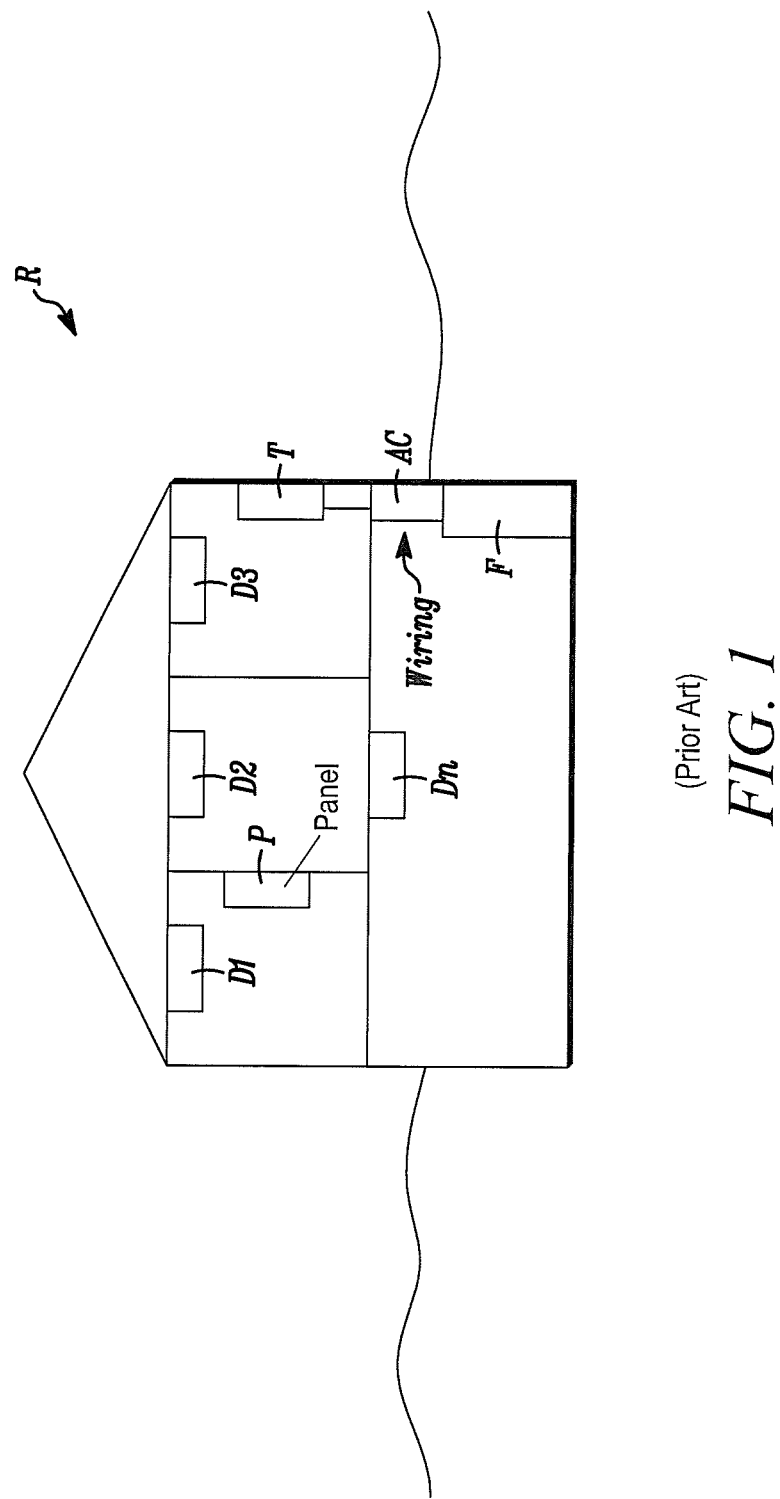
FIG. 1 illustrates a diagram of a prior art monitoring system in a residence.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, a security system monitors a home or commercial building and its occupancy 24/7 with remote connectivity. An integrated HVAC control interface can provide energy savings and offer remote access.

In another aspect, HVAC control modules can be coupled to the security system with multiple configurations to provide low cost installations usable in residential and business applications. Combining the HVAC control modules with a security keypad or a control panel can reduce labor cost and hardware material cost. Providing wireless, satellite, HVAC control modules that use RF communication to/from the security keypad or the control panel can reduce the labor cost at installation and eliminate common component costs, such as providing a display on the wireless, satellite, HVAC control modules. Remote connectivity can be provided to HVAC control functions via the security system.

An integrated solution could incorporate a fully featured HVAC control module that could be plugged into a security control system keypad, such as the TUXEDO TOUCH brand keypad offered commercially by Honeywell International Inc. Additionally, a temperature sensor, relays, seven day scheduling circuitry, and a setpoint control and energy saving ecology mode of operation can be provided.

Additional configurations based on a wireless, satellite, HVAC interface module can be supported with the security system's RF wireless technologies for communicating temperature, relay states, and user operational signals. The wireless, satellite, HVAC interface module greatly reduces installation time by eliminating wire runs back to the security system.

In another aspect, wireless HVAC control modules could be installed at an existing thermostat wall locations. In this configuration, the wireless HVAC control modules could connect back to HVAC equipment with existing wiring. In embodiments hereof, no display is needed at the wireless HVAC control modules. The control panel of the security system can be used to control the HVAC control functions and to display information for a user. This results in a cost reduction, a more convenient user-interface experience, and less clutter on a wall.

Figure 2:
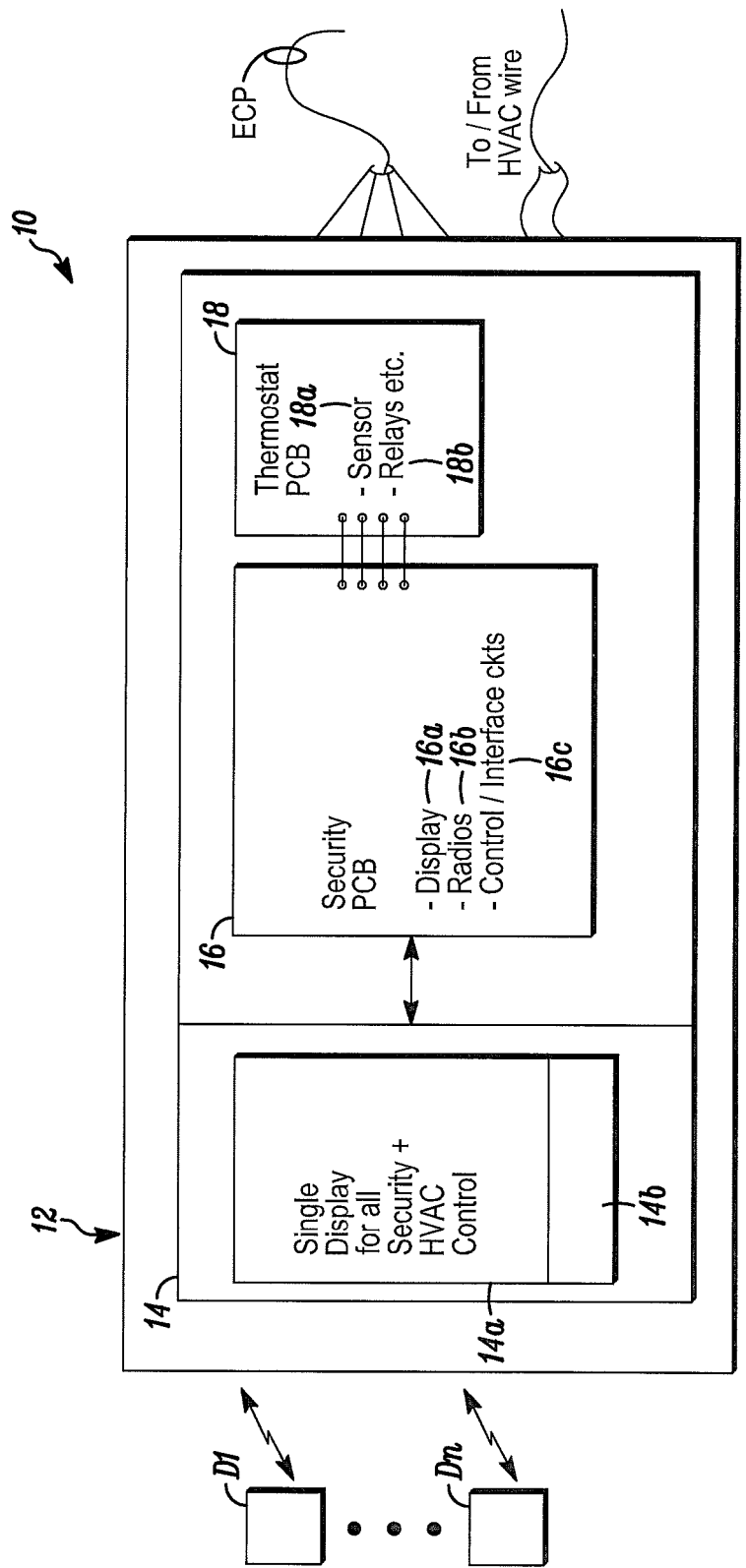
FIG. 2 illustrates an embodiment hereof.

FIG. 2 illustrates an embodiment 10 that includes a housing 12 that carries a security system display/keypad module and thermostat, HVAC control combination in accordance herewith. For example, the housing 12 includes a common display module 14 for both security monitoring and HVAC functions. One known type of display module that includes a touch screen type display is the TUXEDO TOUCH brand line of monitoring control modules, displays, and control circuits marketed by Honeywell International Inc., the assignee hereof. The display module 14 is coupled to a security control board 16. The control board 16 can include display control circuits 16a, radios, and control circuits for wireless communications 16b for communicating with a plurality of detectors, such as D1 . . . Dn of a type noted above. Other control and interface circuits 16c could be included as would be understood by those of skill in the art.

The security control board 16 can be coupled to a thermostatic, HVAC control module 18. The module 18 can be mechanically attached to the housing 12 with a snap-fit. Other mechanical attachments come within the spirit and scope hereof.

The module 18 utilizes display and control features of the display module 14. The module 14 and the security control board 16 can be used without the module 18 if desired.

Communications can be provided via a wired connection through a port and an ECP bus to security related devices, such as a main control panel, door/window detectors, intrusion detectors, glass break detectors, and ambient condition detectors, such as gas, fire, or smoke detectors. The thermostatic, HVAC control module 18 can be coupled by new or existing wiring to HVAC equipment to implement temperature or environmental control.

The module 18 can include one or more temperature sensors 18a and relays 18b for control of furnaces, fans, and/or air conditioning equipment all of which could be coupled to the module 18 with standard HVAC-type wiring as would be understood by those of skill in the art. Advantageously, the module 18 need not carry any control or display elements since the display module 14 can provide all such features for both the security control board 16 and the HVAC control module 18.

Figure 3:
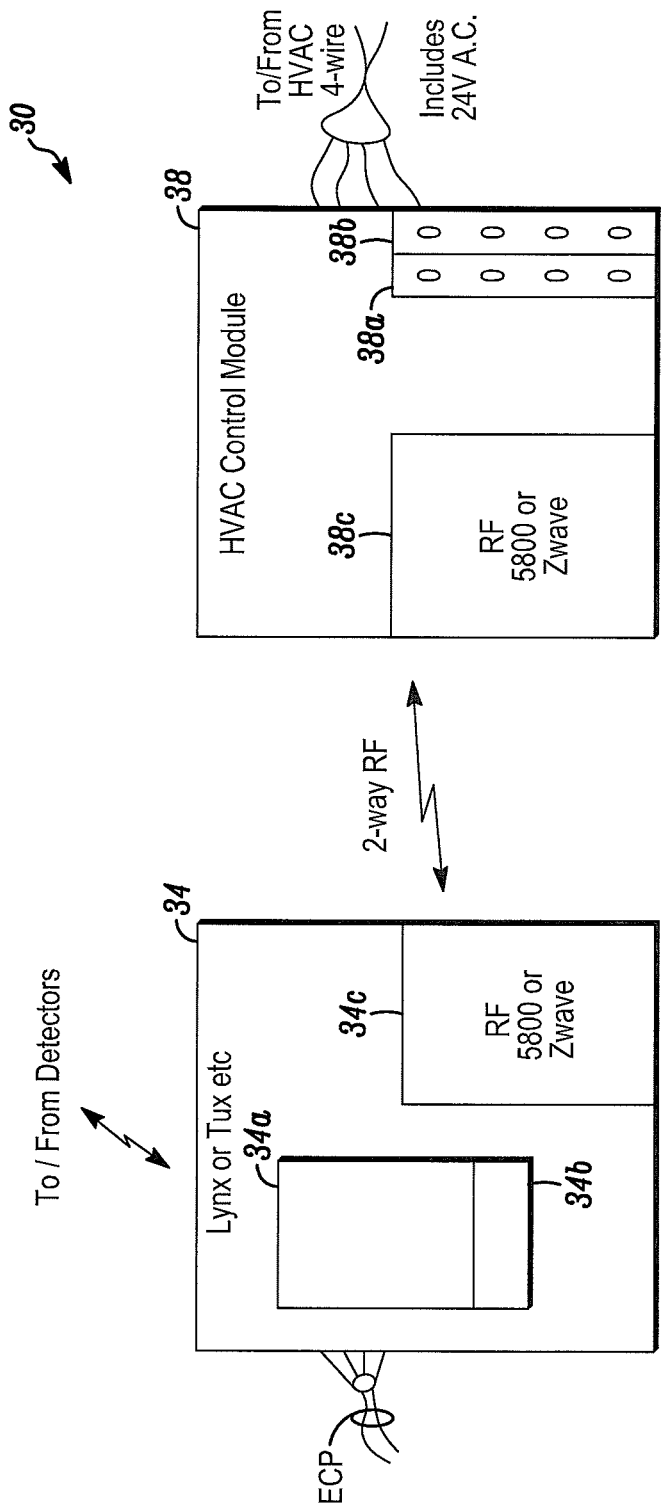
FIG. 3 illustrates another embodiment hereof.

FIG. 3 illustrates a wireless embodiment 30. The embodiment 30 includes an exemplary wireless LYNX or TUXEDO TOUCH brand touch screen module 34. The module 34 can include a display or touch screen 34a and manually operable keys 34b. The module 34 can communicate via a wired ECP bus or via wireless radios 34c, such as radios that use Z-wave or other protocols.

The module 34 can communicate wirelessly with one or more thermostatic/HVAC control modules, such as a module 38. The display 34a can also present information or receive inputs for the module 38, which needs only temperature regulating local keys or switches 38a and LED-type display devices 38b. The push buttons 38a can provide local temperature adjustment, the display devices 38b can provide a local indicator as to an ambient temperature relative to a setpoint temperature, and both can be used for learning or assigning a unique ID. For example, the display could be placed into a "learn mode," and a unique combination or timed sequence of button presses on the module would cause the module to be learned.

The module 38 can communicate with the HVAC equipment via standard wiring as would be understood by those of skill in the art. That wiring can also provide electrical energy, for example, 24 volt AC, to energize the module 38. Because the module 34 displays the information and can accept commands for both an associated security system and the module 38, the cost of the module 38 is advantageously reduced, and the module 38 can present a less obtrusive presence on a wall.

Figure 4:
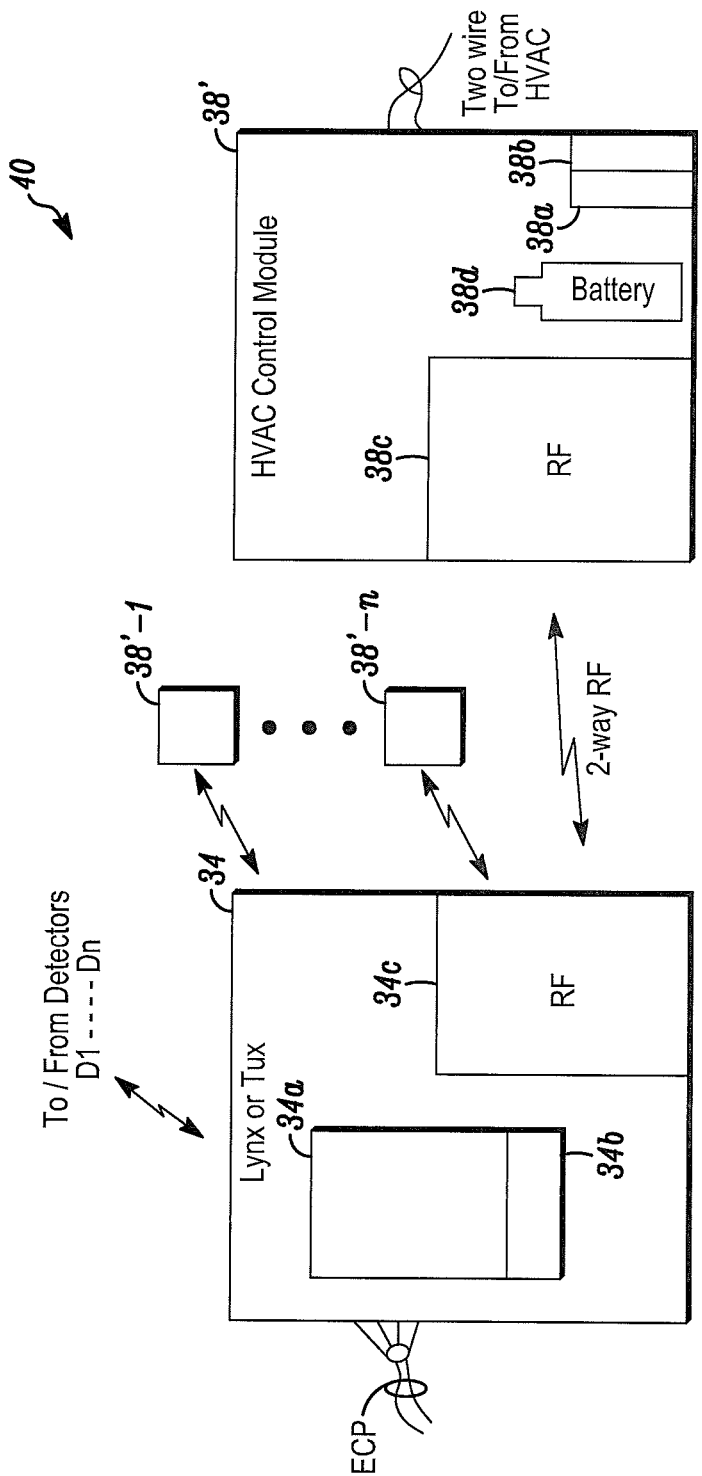
FIG. 4 illustrates yet another embodiment hereof.

FIG. 4 illustrates a wireless embodiment 40 with the module 34 and a wireless thermostatic, HVAC control module 38'. A plurality of modules, similar to 38', such as 38'-1, 38'-2 . . . 38'-n, can be in wireless communication with the control module 34. Those elements in FIG. 4 that have been previously described have been assigned the same identification numeral as previously used and need not be described further.

The module 38' includes a battery 38d, which could be rechargeable. In the embodiment 40, the module 38' needs only a two wire interface to HVAC equipment since it obtains its power locally.

The module 38' can also include manual input buttons or switches 38a and a limited LED display 38b. It will be understood that information pertaining to the module 38' can be presented as previously discussed on a display, such as the display 34a, which can also be used to provide information as to an associated security system. Commands can also be provided wirelessly to the module 38' via the display 34a and the keys 34b.

The module 38' can be operated to maximize available energy from the battery 38d. In an exemplary low power operational method, the module 38' can read an ambient temperature via a two wire communication link to the HVAC equipment once every ten seconds. Readings can be averaged every thirty seconds. The ambient temperature can be transmitted to the module 34 whenever the ambient temperature changes by a predetermined amount, for example, one-half degree C.

With a stable unchanging temperature, a temperature message can be sent to the module 34 with longer time intervals, for example, once an hour to provide a sync pulse to the module 34. The module 34 can use this message for synchronization and to send a control message to the thermostatic module 38' after a predetermined time interval, such as ten seconds. A listening window can be provided for a response on the order of 250 ms without limitation.

Control messages can be sent from the module 34 to the thermostatic module 38' to activate control circuits and relays on the module 38'. Status messages can be transmitted from the module 38' to the control module 34 in response to received instructions from the module 34.

Figure 5:
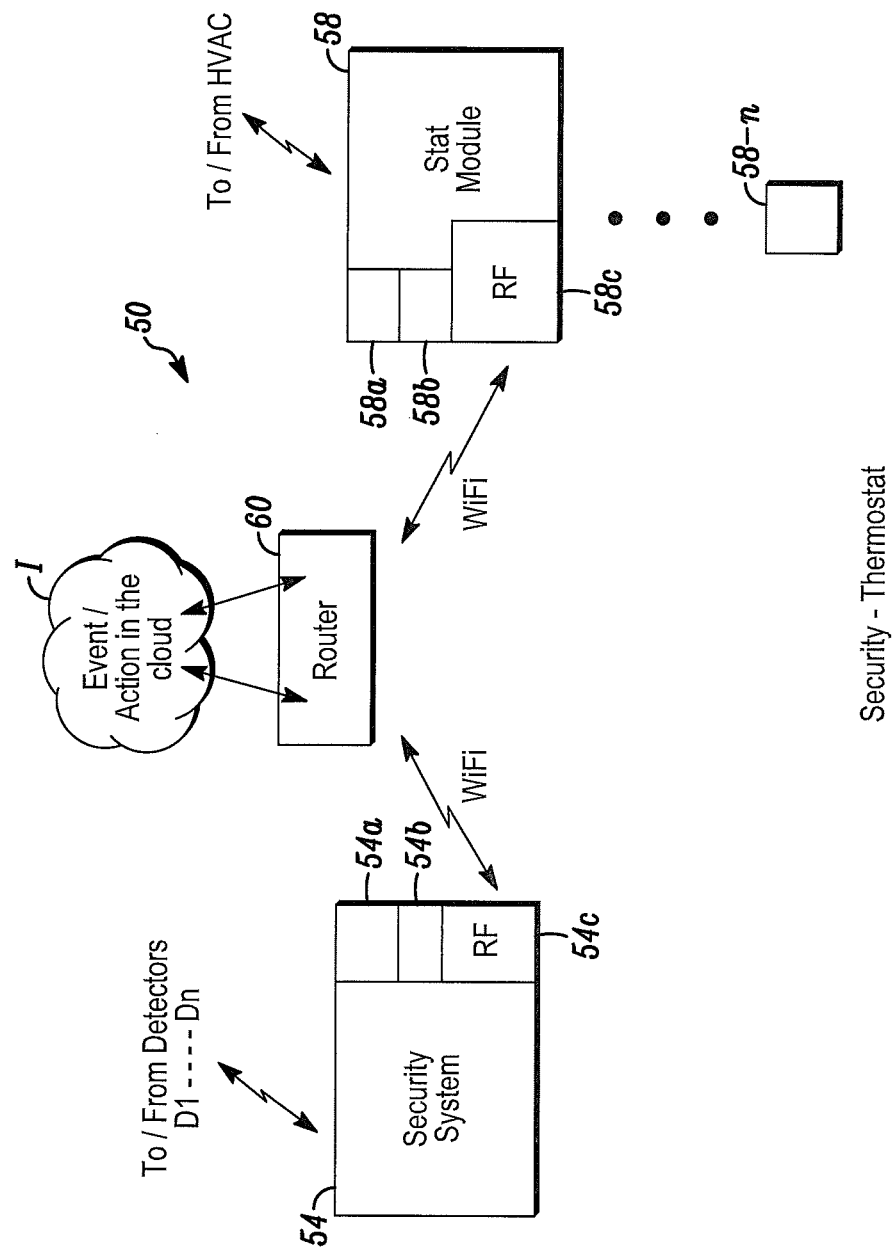
FIG. 5 illustrates a cloud-based embodiment hereof.

FIG. 5 illustrates a cloud based embodiment 50. In the embodiment 50, a security system module 54, comparable to the module 34, is wirelessly network enabled, for example, via Wi-Fi, and can communicate wirelessly via one or more routers, such as 60, and via the Internet I with one or more HVAC control modules, such as modules 58 . . . 58-n, which are also WiFi enabled. In this regard, each of the modules 54 and 58 . . . 58n includes appropriate wireless circuitry, such as 54c and 58c, to implement communications. In the embodiment 50, there are no local connections between the modules 54, 58. All communications are via the Internet. Each of the modules 54, 58 . . . 58-n includes a multi-dimensional display, such as 54a, 58a, and manually operable inputs, such as 54b, 58b. For example, WiFi functionality could be implemented without limitation using any available wireless local area network protocol, such as GSM, CDMA, 4G etc., for internetworked connectivity.

In summary, embodiments hereof offer multiple integrated and wireless HVAC control solutions for a security system. Several exemplary security systems and HVAC control modules have been disclosed herein. Each combination provides an advantageous cost configuration to address a variety of installations and business applications.

There could be a snap-on HVAC control module that can be embedded in a security keypad. There could be wall mounted, wireless, satellite HVAC control modules that use reliable low power RF communication and that transmit and receive data messages with the security keypad. There could be battery powered wireless satellite HVAC control modules that connect to the security keypad. There could be WiFi enabled HVAC control modules that connect to the same cloud as the security keypad and are integrated in the cloud to allow event/action automation in the cloud. Embodiments hereof are useful in new construction or retro applications to achieve low system cost, ease of installation, optimal energy management, and remote control.

For example, a connected security/HVAC system can include a security keypad control unit such as a TUXEDO TOUCH or LYNX TOUCH brand monitoring unit, and a plurality of wireless HVAC interface modules. The HVAC interface modules can be battery or AC powered, PoE satellite temperature zone controllers that are displayless except for some point sources, such as LED's, and wired to operate heating/cooling/fan equipment with known HVAC wiring schemes. Wireless communications can be transmitted to a security system that has a display that provides a common user interface for users to operate security and HVAC control functions.

In another configuration, an HVAC controller module includes a temperature sensor, multiple relays for heating/cooling/fan equipment control, status LED's, push buttons, RF communication radio, HVAC wiring terminal blocks, and a power supply. The module has no display other than the LED's and functions as a satellite HVAC interface module that can be wirelessly controlled by a security keypad or self-contained security panel. The buttons could be used for adjusting a setpoint temperature warmer or cooler by one degree, for set-up, and for device ID assignment.

The LED's could have, for example, three colors. A blue LED can indicate the setpoint temperature is lower than an ambient room temperature, which means an HVAC system is currently providing a cooling function. A green LED indicates the setpoint temperature is matching the ambient room temperature, which means the HVAC system is currently in an idle state and the ambient room temperature is at a desired level. A red LED can indicate that the setpoint temperature is higher than the ambient room temperature, which means the HVAC system is currently providing a heating function.

An HVAC control module that is battery powered can be provided. A power stealing circuit can be included to recharge the battery. Wireless communication can be implemented with a low power mode to wake up periodically to measure temperature, transmit data, and receive RF control messages from a security system.

A cloud connected embodiment includes a security system and one or more HVAC control modules with WiFi connectivity (or other internetworking connectivity) to a cloud for integration. There is no local peer-to-peer connection between the security system and the HVAC control modules. The cloud connects all of the devices and provides event/action control. Each of the security system and the HVAC control modules have a display.

A method of automating HVAC control in an emergency event with a security system integrated with the HVAC control can also be implemented. A system for implementing such a method includes a security system with built-in HVAC control or satellite HVAC control modules and life safety sensors, such as smoke detectors, CO detectors, heat detectors, and other hazard detectors. The method includes detecting a life safety alarm condition from the sensors, determining a source/location/type of the alarm condition, and determining a type of HVAC equipment that needs to be properly turned on or off to better control a spread of the alarm condition. In the case of a CO alarm, the system can turn on ventilation equipment to circulate fresh air inside of a building or region of interest.

Multiple wireless HVAC modules can communicate with a single monitoring system. A connected security/HVAC system can incorporate and communicate with a plurality of wireless satellite HVAC control modules. Such a system could include a plurality of different wireless communication technologies and control the plurality of wireless satellite HVAC control modules in different zones using different wireless technologies, such as Z-Wave, Zigbee, WiFi, 6LoWPAN, Honeywell's 5800 Brand product, and RF6 systems.

A method of improving comfort control with a security/HVAC system is provided that includes multiple environmental sensors in different areas of a building where the security/HVAC system is provided and a table/array/database storing location information of wired or wireless temperature and environmental condition sensors. Readings from several sensors can be averaged or otherwise processed to provide better comfort control in an area of the building.

A method of identifying HVAC equipment trouble conditions, diagnostic symptoms, life expectances, and maintenance indications with a security HVAC system that includes environmental sensors and equipment diagnostic interfacing modules is provided. The security HVAC system comprises a table/array/database storing HVAC equipment information of wired or wireless environment sensors and equipment diagnostic interfacing modules and integrates an algorithm to detect the equipment troubles, the diagnostic symptoms, the life expectances, and the maintenance indications. The security HVAC system can communicate HVAC equipment status to a cloud processing center, end users' mobile devices, and/or a maintenance repair crew processing center. The security HVAC system could also display the HVAC equipment status on a screen for an on-site information update.

In a method of operating security and HVAC equipment on mobile devices through a security system and connected displayless HVAC control modules, the security system or the connected displayless HVAC control modules can be connected by a mobile tablet or a smartphone via a cloud, and users can operate their systems locally and remotely.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A security system comprising:
a security monitoring system panel having an interactive user display module for user control of the security monitoring system panel, wherein the security monitoring system panel is coupled by a wired or wireless medium to a plurality of condition detectors; and
a heating ventilation and air conditioning (HVAC) control module that engages a portion of the security monitoring system panel with a snap-fit, wherein the HVAC control module communicates with the interactive user display module,
wherein the interactive user display module includes a multi-dimensional display unit for visually presenting both HVAC related information provided by the HVAC control module and security related information provided by the security monitoring system panel,
wherein the HVAC control module functions as a satellite HVAC interface module that is controlled by the interactive user display module,
wherein the HVAC control module implements wireless communications in a low power mode causing the HVAC control module to periodically measure a temperature and to transmit the temperature as measured to the security monitoring system panel only when the temperature changes by more than a predetermined amount, and
wherein the HVAC control module uses the wireless communications to communicate with the interactive user display module.

2. The system as in claim 1 further comprising a plurality of wireless HVAC control modules, wherein the multi-dimensional display unit of the interactive user display module presents the HVAC related information associated with the plurality of wireless HVAC control modules.

3. The system as in claim 1 wherein the HVAC control module comprises an alternating current (AC) powered satellite temperature zone controller that is displayless, except for a light-emitting diode (LED).

4. The system as in claim 1 wherein the HVAC control module includes a temperature sensor, multiple relays for controlling heating/cooling/fan equipment, status light-emitting diodes (LED's), push buttons, a radio, HVAC wiring terminal blocks, and a power supply, and wherein the HVAC control module is displayless.

5. The system as in claim 1 wherein the HVAC control module is powered by a battery with circuitry to recharge the battery.

6. The system as in claim 4 wherein the HVAC control module is controlled wirelessly and remotely via a cloud using a mobile tablet or a smartphone.

7. The system as in claim 2 wherein the wireless communications between the security monitoring system panel and the plurality of wireless HVAC control modules are implemented with wireless technologies selected from a class that includes Z-wave, Zigbee, and WiFi.

8. The system of claim 1 wherein the HVAC control module includes a manually operable button for increasing or decreasing the temperature by the predetermined amount, and wherein a status LED provides local temperature information relative to the temperature.

9. The system of claim 1 wherein, in response to the security monitoring system panel detecting a hazardous condition, the security monitoring system panel commands the HVAC control module to activate HVAC equipment to respond to the hazardous condition.

\* \* \* \* \*